Sept. 16, 1969   R. PHILLIPS ET AL   3,467,291
GARMENT HANGER
Filed Sept. 5, 1967
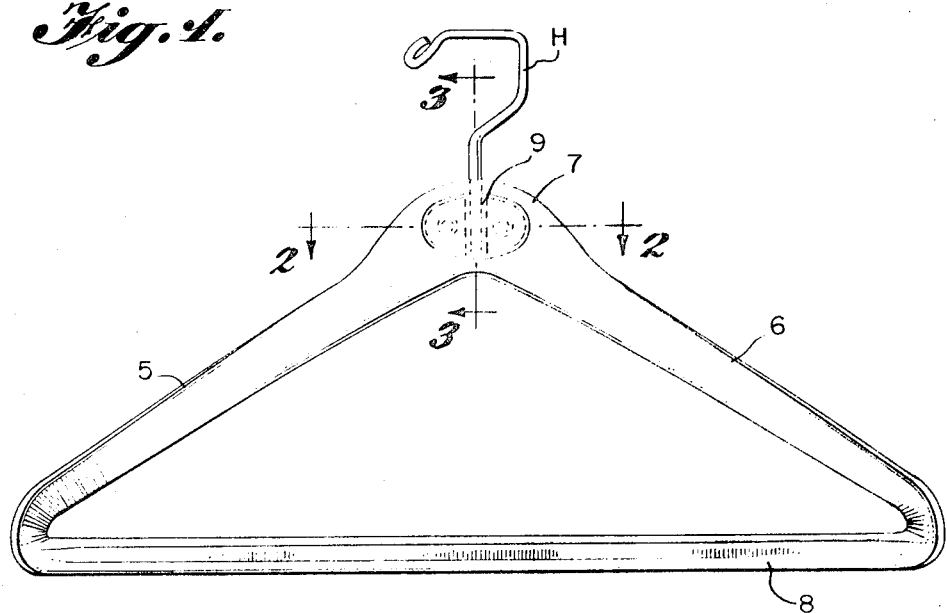
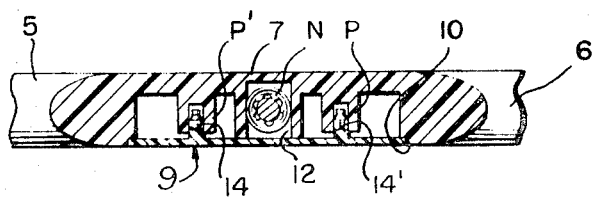
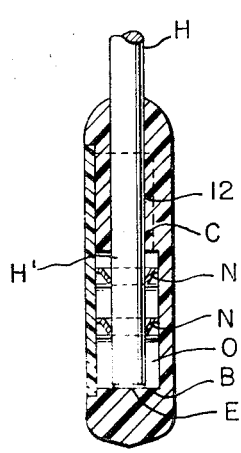
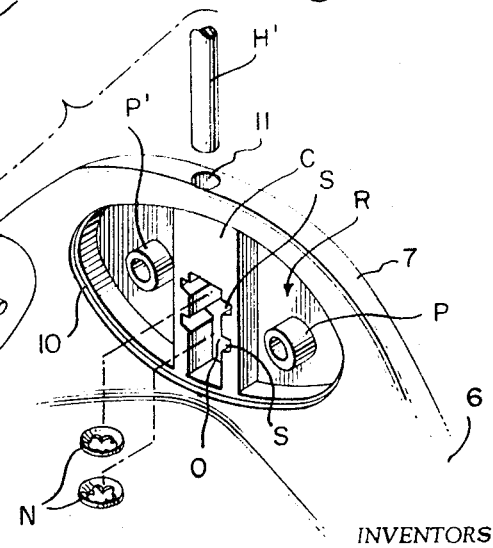
INVENTORS
ROBERT PHILLIPS &
BERNARD B. LEVINE
BY Shoemaker and Mattare
ATTORNEYS

United States Patent Office 3,467,291
Patented Sept. 16, 1969

3,467,291
GARMENT HANGER
Robert Phillips, Roslyn, and Bernard B. Levine, New York, N.Y., assignors to Bernard Plastics Molding Corporation, New York, N.Y., a corporation of New York
Filed Sept. 5, 1967, Ser. No. 665,331
Int. Cl. A41d 27/22
U.S. Cl. 223—85                5 Claims

ABSTRACT OF THE DISCLOSURE

This invention relates to a clothes hanger, and more particularly, a hanger for men's suits and which hanger is frequently referred to as a coat hanger.

---

The provision of a unique means and method for attaching the hook of the hanger to the upper portion thereof and includes a recess at the upper portion of the hanger in which there is disposed a central column having at least one slot therein for reception of a lock nut, and opposite said column there being two outstanding hollow projections which receive therein complemental studs which are carried on the rear of a plate which serves as a fixed closure for the cavity, and on which plate suitable advertising, such as the name of a department store or the maker of the hanger or the like may be imposed.

An object of the invention, therefore, resides in the provision of a unique manner of attaching the hook of a coat hanger or the like to the hanger proper, and which said means is disposed in a cavity in the upper central portion of the hanger and includes resilient lock nuts disposed and properly held in the cavity for allowing the shaft of the hook to be slid into the cavity and firmly gripped and held by the said lock nut to retain the hook in its proper relationship with the hanger.

Another object of the invention is to provide a unique manner and method of attaching and assembling the hook of the hanger with the hanger proper by means of providing a recess at the upper midportion of the hanger and having lock nut means disposed therein and an opening exteriorly of the extreme upper portion of the hanger in alignment with said lock nut means so that the shaft of the hook may be inserted through the said opening and gripped by the lock nut means, and a plate closing the recess.

Another object of the invention is to provide ways and means whereby the shaft of a hook of a hanger is uniquely held in the upper portion thereof and there being an elongated recess into which the said lock nut means is disposed, and a plate covering the opening of the recess.

With the foregoing and other objects in mind, our invention is depicted in the drawings wherein:

FIG. 1 is a front elevational view of the hanger;
FIG. 2 is a cross section on the lines 2—2 of FIG. 1;
FIG. 3 is a vertical cross section on the lines 3—3 of FIG. 1; and
FIG. 4 is an exploded perspective view showing the recess and the lock nut holding means therein and the means for allowing the snapping of the cover plate for the recess and the end of the shaft about to be inserted in the opening at the extreme upper portion of the hanger.

The hanger proper, including the shoulder portions and the trouser supporting bar and including the lock nut holding means in the recess, is preferably molded in one piece of any suitable plastic material. However, other substances, such as wood, aluminum or the like may well have the unique fastening of the hanger and the closing of the opening with a suitable plate or the like.

In particular, the hanger includes the oppositely disposed shoulder portions 5 and 6 and the upper midsection 7 and the trouser or like supporting bar 8 and the cavity closure plate 9.

In viewing FIG. 4, it will be seen that there is a recess R in the upper midportion of the hanger. Centrally of this recess, there is a vertically extending bifurcated column C which has an opening O therein and at least two similar transverse lock nut receiving slots S. The opening is defined by an inset shoulder 10. The face of the column C is substantially flush with this inset shoulder as are the faces of similar hollow projections P and P' on opposite sides of said column. Lock nuts N are of such dimension and size as to be inserted into the transverse slots S in the column C, such as shown in FIG. 2. The opening in these lock nuts provides reilient gripping fingers something on the order of a "Tinnerman" nut. There is an opening 11 in the extreme upper portion of the hanger itself, and this opening registers with a complemental opening 12, see FIGS. 2 and 3, in the column C. The closure plate 9 has its edges 9' tightly in the recess R and is seated against the shoulder 10 which defines the recess and thus the closure plate is permanently irremovably in place.

The method of assembly of the unique locking device for the shank of the hook H, which hook may be of metal, plastic or other suitable material and of any suitable shape, and its shank portion H' is that, first the lock nuts N be inserted in the transverse slots S and then the cover plate, which has similar projections 14 and 14' extending outwardly from the inner face thereof, are snapped into the hollow projections P and P', respectively, and this plate is thus permanently held in position on the seat defining the recess. With this assembly, the end of the shank H' is inserted through the opening 11 and the registered opening 12 in the column and through the resilient gripping members of the openings in the lock nuts until the end E of the shank engages the bottom B of the wall of the cavity, and when in that position, the lock nut, if only one is used, and the lock nuts, if two are used, firmly grip the shank of the hook and maintain it in proper association with the hanger proper. As a matter of fact, once the shaft is slipped into the registered openings 11 and 12 and is gripped by the lock nuts, it is absolutely not removable when so assembled.

The closure plate 9 is shown as being oval but, of course, this plate may be polygonal, rectangular or any desired shape and, of course, the opening defining the recess will be complemental to the shape of the closure plate. If desired, the closure plate may also be made of plastic material or any other substance and, as aforesaid, it may bear the name of the store selling the suits or whatever may be on the hangers, or the name of the manufacturer or some other indicia and/or ornamentation on the front face thereof.

Additionally, it is understood that, in the assembly of the cover plate for covering the recess, instead of placing the cover plate on the recess first and then inserting the shank of the hook into the said aligned openings and through the lock nut means, the cover may well be placed to cover the recess after the shank of the hook has been locked in position by means of the lock nut means in the recess.

We claim:
1. A hanger for clothes at least including shoulder portions thereof and a central upper portion, a recess in the said upper portion of the hanger, a hook having its shank end portion thereof disposed in the recess and means for maintaining the shank portion of the hook in the recess, said means comprising a centrally disposed bifurcated column in said recess and at least one transversely disposed slot means formed in said bifurcated column, there being an opening in the upper portion of the hanger proper, and the upper portion of the column having an opening therein in registry with the opening in the hanger proper, and with the shank portion of the hook disposed in said registered openings, means in said slot means for holding said shank portion, and means for closing the recess.

2. A hanger for clothes at least including shoulder portions thereof and a central upper portion, a recess in the said upper portion of the hanger, a hook having its shank end portion thereof disposed in the recess and means for maintaining the shank portion of the hook in the recess, said means comprising a centrally disposed bifurcated column in said recess and at least one transversely disposed lock nut receiving slot, a lock nut disposed in said slot, there being an opening in the upper portion of the hanger proper, and the upper portion of the column having an opening therein in registry with the opening in the hanger proper, and with the shank portion of the hook disposed in said registered openings and passed through and held by the lock nut in the slot.

3. The hanger as defined in and by claim 2, wherein there are two superposed lock nuts receiving slots in the column member disposed within the recess and similar hollow projections spaced from either side of the column member within the recess, a closure plate, the outline of which conforms to the contour of the opening to the recess and closing same, said closure plate having projections on its inner face, the said projections being disposed in the hollow projections for maintaining the closure plate permanently and irremovably in the recess.

4. The hanger as defined in and by claim 3, wherein the hanger includes shoulder portions and a central upper portion whereat the said recess and its accessories are positioned, and a lower connecting bar for the shoulder portions and the same being of a molded plastic material and in one piece.

5. The hanger as defined in and by claim 3, wherein the closure plate carries suitable indicia on its outer face.

References Cited

UNITED STATES PATENTS

| | | | |
|---|---|---|---|
| 2,137,268 | 11/1938 | Clairon | 223—88 XR |
| 2,716,513 | 8/1955 | Braunstein | 223—94 |

FOREIGN PATENTS

| | | |
|---|---|---|
| 382,402 | 11/1964 | Switzerland. |
| 431,013 | 6/1935 | Great Britain. |

MERVIN STEIN, Primary Examiner

GEORGE H. KRIZMANICH, Assistant Examiner